Oct. 31, 1939.  F. G. HODELL  2,178,041
TIRE CHAIN FOR TRACTORS
Filed Feb. 5, 1937

INVENTOR.
FREDERICK G. HODELL
BY Kris Hudson & Kent
ATTORNEYS

Patented Oct. 31, 1939

2,178,041

UNITED STATES PATENT OFFICE 2,178,041

TIRE CHAIN FOR TRACTORS

Frederick G. Hodell, Cleveland Heights, Ohio, assignor to The Hodell Chain Company, Cleveland, Ohio, a corporation of Ohio Application February 5, 1937, Serial No. 124,213

14 Claims. (Cl. 152—245)

The present invention relates to tire chains for motor driven vehicles and more particularly to tire chains especially adapted for use with pneumatic tired tractors and the like.

An object of the present invention is the provision of a cross chain for a tire chain, comprising a short section of chain having a plurality of spaced non-circular tubular reenforcing tread members encircling the same and maintained in spaced relation with reference to each other.

Another object of the invention is the provision of a tire chain, comprising rim or side chains connected at intervals with cross chains comprising short sections of chain provided with spaced non-circular tubular reenforcing tread members encircling the same and maintained in spaced relation with reference to each other.

Another object of the invention is the provision of a novel and improved reenforcing tread member for a tire chain adapted to be applied to a cross chain thereof and designed to not only increase the life of the chain, but also the bulk or amount of material adjacent the tread portion of the tire, and, therefore, the traction of the wheel in mud, loose dirt, frozen ground or in a heavy wet cover crop, etc., but also to increase the area of contact between the tread member and the link or links engaged thereby, and thus still further increase the life of the chain.

Another object of the invention is the provision of a novel and improved reenforcing tread member for a tire chain, adapted to be applied to a cross chain thereof and engage one or more of the links of the cross chain in a plane or planes substantially parallel with the plane or planes of the link or links engaged.

Another object of the invention is the provision of a novel and improved reenforcing tread member for a tire chain, adapted to be applied to a cross chain thereof and engage one or more of the links of the cross chain in a plane or planes substantially parallel with the plane or planes of the link or links engaged, the construction of said tread member being such that a plurality of links encircled thereby may assume the maximum offset position with reference to each other inherent in their construction.

Another object of the invention is the provision of a novel and improved cross chain comprising a short section of chain encircled at spaced intervals by reenforcing tread members so designed as to not only increase the bulk or amount of material adjacent the tread of the tire and the traction of the wheel, but also to increase the area of contact between the tread members and the link or links which they engage and thus increase the life of the cross member and, in turn, the life of the tire chain.

Another object of the invention is the provision of a novel and improved cross chain comprising a short section of chain and a tubular reenforcing tread member encircling a portion thereof and adapted to engage one or more of the links thereof in a plane or planes substantially parallel with the plane or planes of the link or links engaged.

Another object of the invention is the provision of a novel and improved cross chain comprising a short section of chain and a tubular reenforcing tread member encircling a portion thereof and adapted to engage a plurality of the links thereof in a plane or planes substantially parallel with the planes of the links engaged, the maximum inside diameter of said tread member being such that the link encircled thereby may assume the maximum offset position with reference to each other inherent in their construction.

Another object of the invention is the provision of a novel and improved cross chain comprising a short section of chain and a tubular reenforcing tread member encircling a portion thereof and adapted to engage one or more of the links thereof in a plane or planes substantially parallel with the plane or planes of the link or links engaged.

Another object of the invention is the provision of a novel and improved cross chain comprising a short section of chain and a tubular reenforcing tread member encircling a portion thereof and adapted to engage a plurality of the links thereof in a plane or planes substantially parallel with the planes of the links engaged, the maximum inside diameter of said tread member being such that the links encircled thereby may assume the maximum offset position with reference to each other inherent in their construction.

The present invention resides in certain details of construction and combinations and arrangements of parts, and further objects and advantages thereof will be apparent to those skilled in the art to which it relates from the following description of the preferred embodiment thereof described with reference to the accompanying drawing forming a part of this specification, in which similar reference characters designate corresponding parts throughout the several views and in which.

Figure 1:
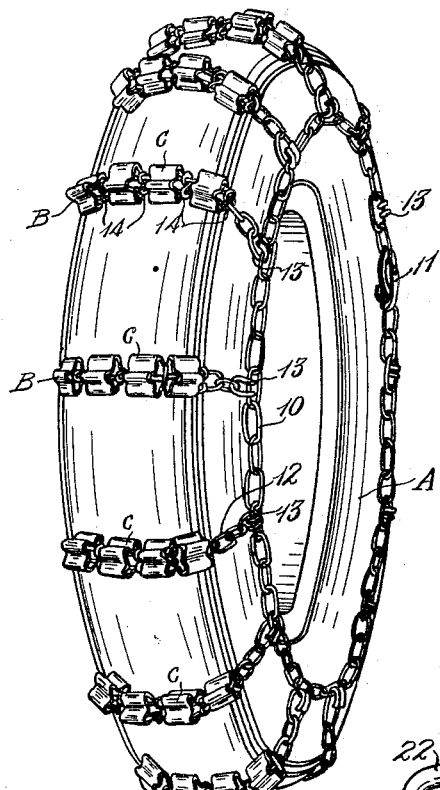
Fig. 1 is a perspective view of a pneumatic tractor tire with a tire chain embodying the present invention in position thereon.

Figs. 4 to 13 inclusive are detail views showing tread members of modified constructions.

While the invention is susceptible of various modifications and alternative constructions, preferred embodiments thereof are shown in the drawing and will hereinafter be described in detail, but it is to be understood that the invention is not limited to the specific forms shown and it is my intention to cover hereby all modifications and alternative constructions that fall within the spirit and scope of the invention as defined by the appended claims.

As previously stated, the present invention is particularly applicable to tire chains for pneumatic tired tractors, which chains are used for the purpose of providing maximum traction in mud, loose dirt, frozen ground, or in a heavy wet cover crop, etc., and thereby permit the utilization of the full horse-power of the tractor under adverse conditions, and the invention is herein shown as embodied in a tire chain of this character.

Referring to the drawing, Fig. 1 shows a tire chain embodying the present invention applied to a pneumatic tire A. The chain shown comprises heavy case-hardened side or rim chains 10 connected at spaced intervals by cross members or cross chains designated generally by the reference character B. The rim chains 10 are provided with fasteners 11 of conventional construction for detachably connecting opposite ends thereof together as is the usual custom. Each of the cross members B comprises a short section or length of ordinary chain comprising a plurality of interlocked ordinary or straight links 12, connected to the side or rim chains 10 by suitable connecting links 13. Each cross chain is provided with a plurality of spaced non-circular sleeve or tread members, designated by the reference character C, encircling a plurality of the ordinary links thereof and held in predetermined spaced relation with reference to each other by some suitable means, as by S-links 14 connected to the links of the cross chain adjacent opposite ends of the tread members. The tread members C are preferably tubular, cross or star-shaped in cross-section, and as shown, the arms thereof are U-shaped and their height is greater than the radius of curvature of the outer ends thereof as shown, the tread members C are longer than the length of the ordinary links of the cross chain.

The tread members C are preferably positioned on the cross chain so that they embrace parts of at least two links of the cross chain, and the maximum inside diameter or clearance of the tread member is considerably greater than the outside width of the links 12 encircled thereby so that the tread member can engage the respective links encircled thereby in planes substantially parallel with the respective planes of the links engaged. The maximum inside diameter or clearance of the tread members is such that the links encircled thereby can assume the maximum offset position with reference to each other inherent in their construction. This allows the links to work freely and the fact that the tread members overlap adjoining links affords considerable protection to the joint, etc.

As shown, in Figs. 1 to 7 inclusive, 12, and 13, the members C are made of sheet metal bent to the desired shape and connected along one side by an interlocking lapped joint, but it will be understood that the tread members may be made of any suitable material, such as, cast metal, rubber, etc., and may be made in any convenient manner. Tread members of alternative construction are shown in Figs. 8 and 9, and 10 and 11. In the former the tread member 15 is made of tubular material of desired cross section, while in the latter the interlocking lapped joint shown in Figs. 3, 7, etc. has been replaced by a welded butt joint.

Figure 6:
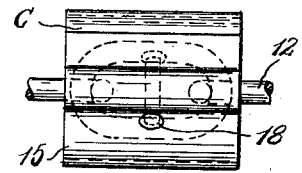
Figure 7:
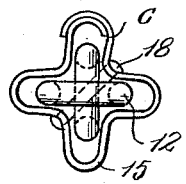
Figure 8:
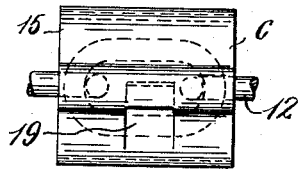
Figure 9:
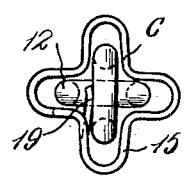
Figure 10:
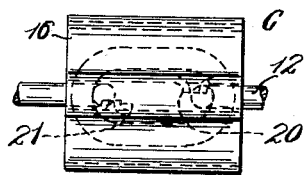
Figure 11:
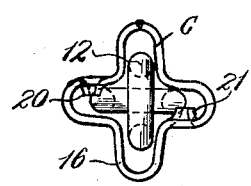
Figure 12:
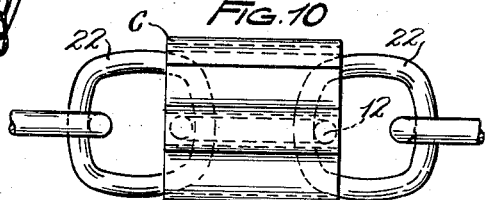
Figure 13:
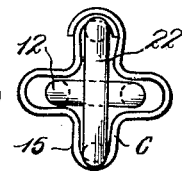
Figure 4:
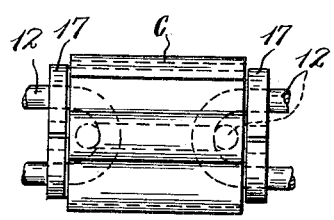
Figure 5:
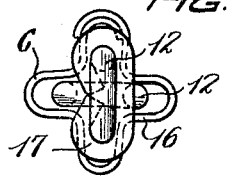
Figure 3:
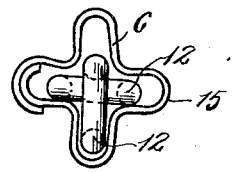
Fig. 3 is a section approximately on the line 3—3 of Fig. 2.
Figure 2:
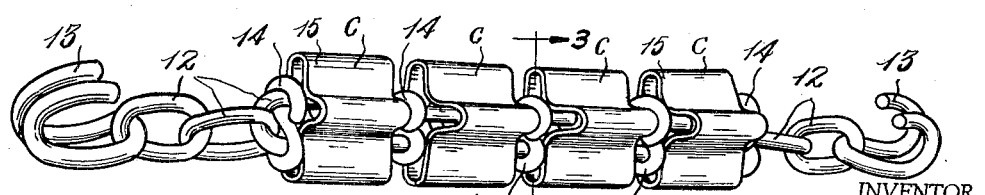
Fig. 2 is an enlarged view of one of the cross chains shown in Fig. 1.

In the preferred embodiment of the invention referred to above, S-links 14 are employed to maintain the tread members in predetermined spaced relation with reference to the cross chain, but it will be understood that any suitable means may be employed for this purpose. A number of optional arrangements are shown in Figs. 4 to 13 inclusive. The first two of these figures, that is, Figs. 4 and 5, show a construction wherein the longitudinal movement of the tread member C along the cross chain is limited by links 17 similar to the links 14 but of modified construction, secured to the cross chain adjacent opposite ends of the tread member. In this instance the links 17 merely encircle the cross chain without going through the links 12 thereof as is the case in the preferred embodiment. Figs. 6 and 7 show a construction wherein pin 18 secured to the tread member C projects through the central openings in one of the links 12, thereby limiting the movement of the tread member on the cross chain. Figs. 8 and 9 show a construction wherein a tongue-like member 19 punched out of the tread member 15 and projected towards the center of the tread member engages the ends of the links 12 and limits the movement of the tread member along the cross chain. Figs. 10 and 11 show a construction somewhat similar to that shown in Figs. 8 and 9, except that the tread member 16 is punched inwardly at two places 20 and 21 by a circular punch, whereas in the construction shown in Figs. 8 and 9 a single tongue 19 is cut from the tread member. Figs. 12 and 13 show a construction wherein the links 22 of the cross chain at both ends of the tread member C are enlarged to the extent that the outside diameter thereof is greater than the inside diameter of the tread member. The foregoing alternative constructions are merely suggestive of various ways in which the longitudinal movement of the tread member relative to the cross chain can be limited, and it is to be understood that the invention is not limited to the specific forms shown.

While the preferred embodiment of the invention has been described with considerable detail, the invention is susceptible of various modifications and alternative constructions and, as previously stated, it is not limited to the specific form shown, and it is my intention to cover hereby all modifications and alternative constructions that fall within the spirit and scope of the invention as defined in the appended claims.

Having thus described my invention. I claim:

1. A cross chain comprising a short section of chain, a plurality of non-circular tubular tread members each encircling a portion of a plurality of the links of said chain, and means for maintaining said tread members in spaced relation to each other.

2. A cross chain comprising a short section of chain, a plurality of non-circular tubular tread members each encircling a portion of a plurality of the links of said section of chain, and means projecting from said tread members toward the center thereof for maintaining said tread members in spaced relation to each other.

3. A cross chain comprising a short section of chain, a plurality of non-circular tubular tread members each encircling a portion of a plurality of the links of said section of chain, a projection on said tread members formed from a part thereof and extending toward the center for maintaining said tread members in spaced relation to each other.

4. A cross chain comprising a short section of chain, a plurality of non-circular tubular tread members encircling the same, and link members attached to said chain at opposite ends of said tread members for maintaining the same in spaced relation to each other.

5. A cross chain comprising a short section of chain, and a plurality of non-circular tubular tread members encircling the same, the outside width of a link of said cross chain adjacent one of said members being greater than the maximum inside width of the tread member adjacent thereto.

6. A reenforcing tread member for a cross chain, said tread member comprising a cross- or star-shaped tubular sleeve member adapted to encircle a portion of the cross chain and engage the sides of a plurality of the links thereof in planes substantially parallel with the planes of the respective links engaged.

7. A reenforcing tread member for a cross chain comprising a short section of ordinary straight link chain, said tread member comprising a cross- or star-shaped tubular sleeve member adapted to encircle a portion of the cross chain and engage the sides of a plurality of the ordinary links thereof in planes substantially parallel with the planes of the respective links engaged, the maximum inside diameter of said tread member being about one and one-half times the outside width of the ordinary links of the cross chain with which it is adapted to be used.

8. A reenforcing tread member for a cross chain, said tread member comprising a cross- or star-shaped tubular sleeve member adapted to encircle a portion of the cross chain, the arms of said tread member being U-shaped and the radius of curvature of the outer ends thereof being less than the height thereof.

9. A cross chain comprising a plurality of links, a plurality of non-circular tubular tread members encircling a portion of the links, said tread members being longer than the length of the links encircled thereby, and means for maintaining said tread members in spaced relation to each other.

10. A cross chain comprising a short section of chain and a cross- or star-shaped tubular sleeve member encircling a portion thereof and adapted to engage the sides of a plurality of the links thereof in planes substantially parallel with the planes of the respective links engaged.

11. A cross chain comprising a short section of ordinary straight link chain and a cross- or star-shaped tubular sleeve member encircling a portion thereof and adapted to engage the sides of a plurality of the ordinary links thereof in planes substantially parallel with the planes of the respective links engaged.

12. A cross chain comprising a short section of chain and a cross- or star-shaped sleeve member encircling a portion thereof and adapted to engage the sides of a plurality of the links thereof in planes substantially parallel with the planes of the respective links engaged, the maximum inside diameter of said sleeve member being about one and one-half times the outside width of the links engaged thereby.

13. A cross chain comprising a short section of chain and a cross- or star-shaped tubular sleeve member encircling a portion thereof and adapted to engage the sides of a plurality of the links thereof in planes substantially parallel with the planes of the respective links engaged, the maximum inside diameter of said sleeve member being such that the links engaged thereby can assume the maximum offset position with respect to each other inherent in their construction.

14. A tire chain comprising rim or side chains, and a cross chain connected to said rim chains, said cross chain comprising a section of chain and a cross- or star-shaped tubular sleeve member encircling part of the links of the cross chain and adapted to engage the sides of a plurality thereof in planes substantially parallel with the planes of the respective links engaged.

FREDERICK G. HODELL.